(12) United States Patent
Sturm et al.

(10) Patent No.: US 11,384,573 B2
(45) Date of Patent: Jul. 12, 2022

(54) LOCK FOR A MOTOR VEHICLE

(71) Applicant: Kiekert AG, Heiligenhaus (DE)

(72) Inventors: Christian Sturm, Krefeld (DE); Bernhard Drost, Isselburg (DE); Murat Özdogan, Wuppertal (DE)

(73) Assignee: Kiekert AG, Heiligenhaus (DE)

( * ) Notice: Subject to any disclaimer, the term of this patent is extended or adjusted under 35 U.S.C. 154(b) by 849 days.

(21) Appl. No.: 16/062,647

(22) PCT Filed: Nov. 28, 2016

(86) PCT No.: PCT/DE2016/100553
§ 371 (c)(1),
(2) Date: Jul. 10, 2018

(87) PCT Pub. No.: WO2017/101900
PCT Pub. Date: Jun. 22, 2017

(65) Prior Publication Data
US 2018/0371807 A1    Dec. 27, 2018

(30) Foreign Application Priority Data
Dec. 15, 2015  (DE) .................... 10 2015 121 848.8

(51) Int. Cl.
| | |
|---|---|
| E05B 83/24 | (2014.01) |
| E05B 47/06 | (2006.01) |
| E05B 79/20 | (2014.01) |
| B62D 12/02 | (2006.01) |
| B62D 25/10 | (2006.01) |
| B60R 21/00 | (2006.01) |

(52) U.S. Cl.
CPC ............ *E05B 83/24* (2013.01); *B62D 12/02* (2013.01); *B62D 25/10* (2013.01);
(Continued)

(58) Field of Classification Search
CPC ...... E05B 83/24; E05B 47/0676; E05B 79/20; E05B 79/10; E05B 83/243; E05B 53/003;
(Continued)

(56) References Cited

U.S. PATENT DOCUMENTS

| | | | |
|---|---|---|---|
| 2006/0255595 A1* | 11/2006 | Schretzlmeier | E05B 83/26 292/93 |
| 2010/0237632 A1* | 9/2010 | Browne | E05B 81/14 292/201 |

(Continued)

FOREIGN PATENT DOCUMENTS

| | | |
|---|---|---|
| DE | 2116448 | 10/1972 |
| DE | 19804066 | 8/1998 |

(Continued)

OTHER PUBLICATIONS

International Search Report and Written Opinion for corresponding Patent Application No. PCT/DE2016/100553 dated Feb. 14, 2017.
(Continued)

*Primary Examiner* — Christine M Mills
*Assistant Examiner* — Yahya Sidky
(74) *Attorney, Agent, or Firm* — Renner, Otto, Boisselle & Sklar, LLP

(57) ABSTRACT

A method for the actuation of an actuating device and to an actuating device with at least one lock, in particular a lock for a front bonnet of a motor vehicle, comprising a rotary latch, wherein the rotary latch can be brought by means of a lock holder into a locked position, with an actuating element connected to the lock, wherein, after a first actuation of the actuating element, the front bonnet can be brought from a locked position into a supported position and wherein, after at least one further actuation of the actuating element, the front bonnet can be brought into a release position, and with an actuation transmission means, in particular a Bowden cable, between the actuating element and the lock, wherein a means for disabling the actuating device is provided, with the result that an actuation of the lock by means of the actuating element can be suppressed.

10 Claims, 3 Drawing Sheets

Figure 1:
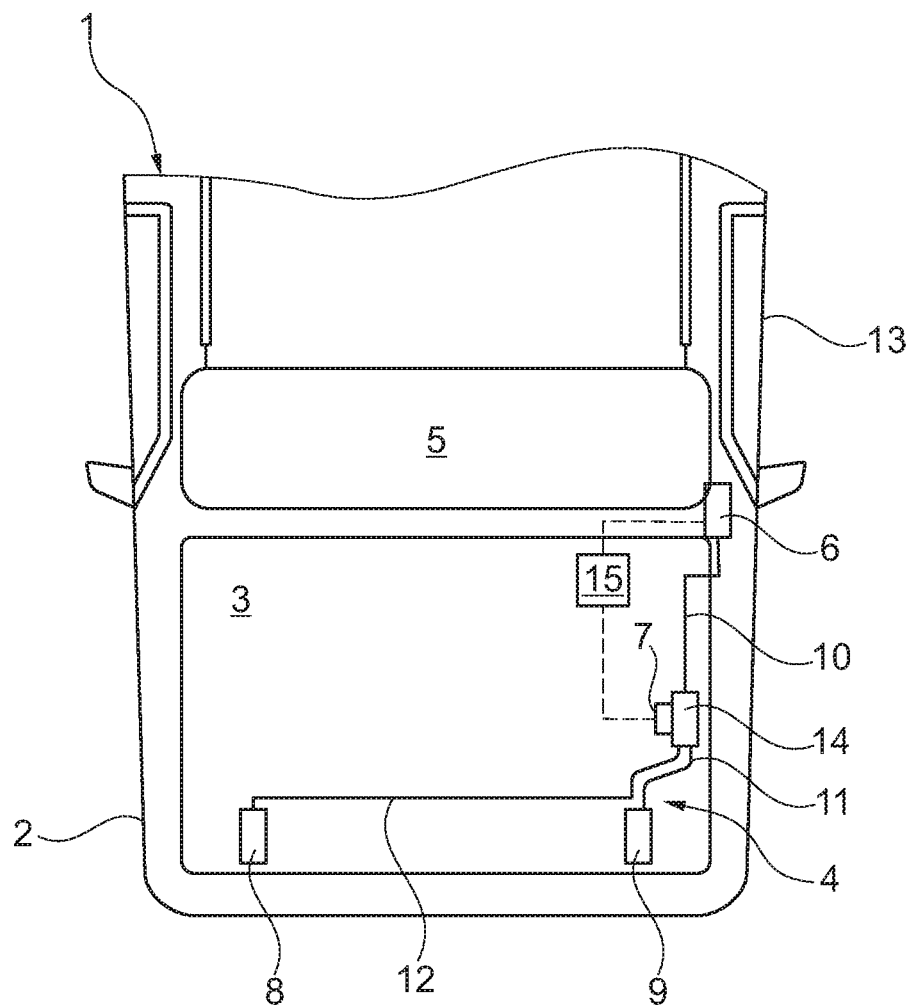

(52) U.S. Cl.
CPC .......... *E05B 47/0676* (2013.01); *E05B 79/20* (2013.01); *B60R 21/00* (2013.01)

(58) Field of Classification Search
CPC ....... E05B 53/005; B62D 12/02; B62D 25/10; B62D 12/12; B60R 21/00; Y10T 292/0855; Y10T 292/086; Y10T 292/1047; Y10S 292/14
USPC .................................................. 180/289, 271
See application file for complete search history.

(56) References Cited

U.S. PATENT DOCUMENTS

| | | | |
|---|---|---|---|
| 2013/0238187 A1 | 9/2013 | Zysk | |
| 2016/0340941 A1* | 11/2016 | Taurasi | .................... E05B 77/08 |
| 2017/0058575 A1* | 3/2017 | Farooq | .................... E05B 81/77 |
| 2021/0237804 A1* | 8/2021 | Gillis | ....................... E05B 77/54 |

FOREIGN PATENT DOCUMENTS

| | | | | |
|---|---|---|---|---|
| DE | 19816991 A1 | 11/1999 | | |
| DE | 102006012062 A1 | 9/2007 | | |
| DE | 102007003292 | 7/2008 | | |
| DE | 102012004792 A1 * | 9/2013 | ............. | E05B 83/26 |
| EP | 1411191 | 4/2004 | | |
| FR | 2810754 | 12/2001 | | |
| FR | 2810754 A1 * | 12/2001 | ........... | E05B 47/068 |
| WO | 99/27218 | 6/1999 | | |

OTHER PUBLICATIONS

Translation of Chinese Office Action dated Dec. 17, 2019 for related Chinese Application No. 2016800733071.

* cited by examiner

LOCK FOR A MOTOR VEHICLE

The invention relates to an actuating device with at least a lock, in particular a lock for a front bonnet of a motor vehicle, comprising a rotary latch, wherein the rotary latch can be brought by means of a lock holder into a locked position, an actuating element connected to the lock, wherein after a first actuation of the actuating element the front bonnet can be brought from a locked position to a supported position and wherein after at least one further actuation of the actuating element the front bonnet can be brought into a release position and an actuation transmission means, in particular a Bowden cable between the actuating element and the lock.

Actuating devices in motor vehicles are in particular subject to exacting safety requirements if a risk exists for the motor vehicle driver and/or other road users by its actuation. Such an actuating device which is subject to a safety standard is an actuating device for a lock or locking system for a flap, bonnet, door and/or sliding door. If, for example, during a journey with the motor vehicle an unintentional actuation of the actuating element to open a motor bonnet, for example, occurs, the motor bonnet can thus open as a result of airflow and obscure the driver's vision, for example. In such cases, damage to the motor vehicle and/or further damage also with other road users will absolutely occur. In order to prevent such accidents and/or damage, there are safety standards which the actuating devices must fulfill. For example, reference can be made to ISO 26262 hereby which defines an ISO standard for safety-related electrical/electronic systems in motor vehicles and is known from the Automotive Safety Integrity Level (ASIL) or the Federal Motor Vehicle Safety Standard 113 (FMVSS 113) of the United Nations. Such a standard defines the safety-related functions of the actuating devices in the motor vehicle and in particular also an actuating device of a latch for a front bonnet of a motor vehicle.

An actuating device for a lock of a front bonnet of a motor vehicle has become known from DE 198 04 066 A1. The actuating device has a lock to bolt a front bonnet of a motor vehicle and an arresting element with which a front bonnet in a locked position can be brought into a supported position and finally into a release position. The lock can thus be opened from the inside of the motor vehicle by means of a lever and a Bowden cable coupled with this lever, wherein a pawl bolting the rotary latch of the lock is shifted away from the rotary latch.

The front bonnet published in DE 198 04 066 A1 could be brought into the supported position by means of at least a pre-tensioned springing device in which an arresting element prevents further opening of the front bonnet by means of the supported position. A handle is located on the arresting element which enables manual pivoting of the arresting element into a release position in which the front bonnet must be completely opened. For this purpose, the handle should be able to be manually operated as customary through a gap formed between the front edge of the front bonnet located in the supported position and the chassis or the fan of the motor vehicle. The operating hand can thus reach a part of the motor vehicle covered with dirt particles and become contaminated. The handle can also be contaminated by means of turbulence in a front engine compartment raising dirt particles from the carriageway so that, even in the case of careful actuation of the handle, contamination of the operating hand is inevitable.

The aforementioned opening of the front bonnet of the motor vehicle describes a procedure in which the front bonnet can be opened by means of two separate actuations, wherein the uncoupled procedural steps depict a securing system which guarantees that the front bonnets do not pose a risk for the driver of the motor vehicle or the traffic even in the case of unintentional actuation of an actuating element.

A further actuating device for a latch of a motor vehicle and in particular a front bonnet of a motor vehicle has become known from DE 10 2007 003 292 A1. A pivot lever arranged inside the motor vehicle as an actuating element is connected to a Bowden cable which is connected to the lock. The lock encompasses a rotary latch which can be brought into a locked position by means of a lock holder. To open the lock and thus to move or transfer the front bonnet from the locked position into a supported position an operator must operate the lever or the actuating element and thus unlock the lock. The front bonnet consequently goes from the locked position into the supported position in which the front bonnet is held in position by means of an arresting hook in which the front bonnet cannot be opened independently. Only after repeated actuation of the actuating element the arresting hook is also moved, wherein the front bonnet goes into a release position.

A problem resulting from the actuating devices known from the state of the art is that during unintentional opening of the front bonnet or unintentional actuation of the actuating device the lock can also be opened when the vehicle is in motion and can be opened so far that the front bonnet can reach into a release position.

The object of the invention is to provide an improved actuating device. In particular, it is an object of the invention to provide an actuating device which prevents unintentional opening of the lock and preferably prevents this during movement of the motor vehicle. It is also an object of the invention to provide an actuating device which is of a simple construction and cost-effective to execute.

The object is solved according to the invention by the characteristics of independent patent claims 1 and 10. Advantageous embodiments of the invention are stated in the sub-claims. It is pointed out that the exemplary embodiments described hereafter are not restrictive; instead, any possible variations are possible of the characteristics described in the description and the sub-claims.

According to the patent claim, the object of the invention is solved by an actuating device with at least a lock, in particular a lock for a front bonnet of a motor vehicle, comprising a rotary latch, wherein the rotary latch can be brought by means of a lock holder into a locked position, an actuating element connected to the lock, wherein after a first actuation of the actuating element the front bonnet can be brought from a locked position to a supported position and wherein after at least one further actuation of the actuating element the front bonnet can be brought into a release position and an actuation transmission means, in particular a Bowden cable between the actuating element and the lock, wherein a means for disabling the actuating device is provided, with the result that actuation of the latch by means of the actuating element can be prevented. By means of the formation of the actuating device according to the invention, the possibility is now created of providing an actuating device which is able to disable the lock, for example, in the case of exceeding a definable limit speed. This is advantageous in particular if an operator unintentionally operates the actuating element when the vehicle is moving and the lock can therefore be brought into an open position. If, in this situation, the means for disabling acts on the actuating device, actuation of the actuating element thus remains without effect, wherein the lock remains locked and the front bonnet remains in the locked position. The highest degree of safety can consequently be attained.

A device with which a lock in a motor vehicle can be controlled remotely is hereby considered an actuating device according to the invention. The locks which are used in a safety-related area are preferably encompassed by the actuating device. Locks used in flaps, sliding doors, lateral doors or in area of the motor bonnet must hereby be stated as locks, for example. These locks which need to be secured from unintentional opening or in which at least a two-phase closure or opening process is used.

The lock encompasses a rotary latch which has at least a main latching position. The main latching position of the rotary latch is associated with a locked position of the front bonnet. This means that where the rotary latch is located in its main latching position, the front bonnet is also located in the locked position. The locked position thus defines the interplay between the lock and the front bonnet. Regardless of the relative position between the lock and the front bonnet, which are fixed as a relative position to one another in a main latching position, alternatively a drive means can be used that the lock located in the main latching position can move, including the front bonnet. The front bonnet is moved closer to the fan grille or the front sheet in order to minimize the closure gap, for example. The front bonnet can encompass a lock holder which interacts with a lock located in the motor vehicle. Alternatively, an inverse arrangement is naturally also conceivable according to the invention.

An actuating element, such as a pivot lever, for example, is arranged in the motor vehicle for remote actuation. An actuation transmission means acts between the lock and the actuating element. The actuation transmission means can be a Bowden cable in one embodiment. The lock can then be unlocked by means of the operating lever and with the aid of the actuation transmission means. After initial actuation of the actuating element the lock reaches a supported position in which at least one further actuation of the actuating element is necessary in order to transfer or bring the front bonnet into a release position. A front bonnet can then be opened in the release position.

The actuating device has a means for disabling the actuating device according to the invention. The means for disabling acts on the actuating device in such a way that actuation is prevented. By means of such a safety function, the greatest degree of safety can be provided as unintentional actuation of the actuating element, for example, is not possible to transfer the lock or the front bonnet from a main latching position or locked position into a release position.

The means for disabling acts directly on the actuation transmission means in one embodiment of the invention. The actuating device encompasses at least a lock, an actuation transmission means and an actuating element. The actuating element can be a handle or pivot lever, for example. If the actuation transmission means is a Bowden cable, for example, the means for disabling can thus easily be positioned along the Bowden cable. This is advantageous in particular if insufficient space is available to position further components in the area of the latch and/or the actuating element.

It can also be advantageous if the means for disabling is a component of an actuating element and/or the lock. If the means for disabling is directly integrated into the lock, for example, no further installation steps are thus necessary for further components in the motor vehicle. In this case, the lock would be equipped with a further function in order to integrate the safety-related aspect into the lock. In the case of arrangement in the area of the actuating element, a modular construction of the actuating element can also be envisaged with a further integral function in order to be able to dispense with further installation steps and thus manage with the least possible number of components for execution of the safety-related aspect or a function. In both cases, the further function can only be integrated and installed as a modular unit in the area of the lock and/or the actuating element.

In one embodiment, the actuation transmission means can be blocked by means of the means for disabling. Regardless of the positioning of the means for disabling, the means can block the actuating element, the actuation transmission means and/or the lock. Blocking of the actuating element, for example, prevents unintentional opening of the locking mechanism as the operating function is not available by means of the blocking mechanism. In one embodiment, for example, the actuating element or the pivot lever can be blocked by a bolt operated by an electromotor. It is naturally also conceivable that the actuation transmission means is disabled by means of an actuating element, a bolt, a braking unit and/or a comparable blocking means.

Even if a small number of mechanisms are also stated here to block the movement of the actuation transmission means, other mechanisms can thus naturally also be used which prevent or block movement of the actuation transmission means. Furthermore, the lock can also alternatively be blocked itself. For example, this can occur by a triggering lever to trigger a pawl acting on the rotary latch being blocked in its movement. The blocking mechanisms are preferably operated electrically, this is especially advantageous as an electrical power supply is available in the motor vehicle.

In a further embodiment of the invention, the actuating means can be disengaged by means of the means for disabling. The actuating element which encompasses the actuation transmission means and/or the lock is encompassed here in turn. Disengagement hereby causes, for example, a Bowden cable uninstalled from the actuating element to be disengaged during actuation of the actuating element, for example, so that the actuating element, such as a pivot lever, accomplishes a pivot movement; there is no engagement into the actuation transmission means so that the pivot movement does not initiate an opening process. The disengagement in the operating chain can also be described as bolting according to the descriptions of a lock function. In the case of the bolting of a lock, an operating chain is usually also interrupted. If, consequently, the actuating element is disengaged with an actuation transmission means, the actuating device is thus present in a bolted state.

In the same way, the actuation transmission means can thus also be bolted, if, for example, the actuation transmission means can be uncoupled as a bolting element executed as a separate module. In this case, a Bowden cable would be arranged between the actuating element and the coupling module and a further Bowden cable between the coupling module and the lock. If now, for example, the coupling element is uncoupled in the uncoupling module by means of an electrical drive, no consistent operating chain is thus present between the actuating element and the lock. The coupling is uncoupled, wherein the actuating device would be bolted by means of the coupling module. Equally, uncoupling in the lock can also occur automatically, wherein a Bowden cable is uncoupled from the latch, for example. In this case too, during actuation of an actuating element the actuation transmission means is operated; however, this would not lead to unlocking of the lock and thus transfer from a locked position into a supported position or, if necessary, from a supported position into a release position as the actuation transmission means would be uncoupled from the lock. Actuation of the actuating element thus remains ineffective in relation to the actuating device.

A further advantageous embodiment of the invention results if the means for disabling is operated electrically. As already stated above, electrical energy is available in the motor vehicle which enables cost-effective integration of a means for disabling. Electrical drives which can be executed as microdrives, for example, can be provided cost-effectively and with a microconstruction and, for example, operate a coupling module cost-effectively, in a microconstruction and in a simple construction. An electrical drive can thus block the actuating device simply and/or uncouple it and thus disable it.

If a switching means is provided for, wherein by means of the switching means a position of the means for disabling can be queried, a further advantageous embodiment of the invention thus results. A switching means to verify or detect the position of the means for disabling of the actuating device hereby enables a further increase in safety. In particular where unintentional opening of the closure device or the lock should be prevented, it can be advantageous if the functional position of the means for disabling is known or can be detected in order to prevent opening. For example, also by means of the switching means a warning signal can be controlled with which the operator of the motor vehicle can be notified that due to the actuation of the actuating device a traffic-endangering situation can be caused or that it is displayed to the operator that this actuating device is not currently available. In any case, the switching means can increase the safety of the actuating device.

If a control is provided for, a further embodiment of the invention thus results, wherein by means of the control a speed of the motor vehicle can be recorded and wherein dependent on a speed the means for disabling can be controlled By means of the control integrated into the motor vehicle, on the one hand the speed of the motor vehicle can be recorded; however, it can simultaneously also be that the switching means assigned to the actuating device is recorded as a function of the position of the means for disabling. An advantageous embodiment results hereby to the extent that in particular within the scope of a specifiable limit speed of the motor vehicle, actuation of the actuating device can endanger traffic and should thus no longer be available as a function. In particular in cases where pure mechanical opening of the lock is possible according to the state of the art, the invention offers improved safety as disabling of the actuating device can be specified or controlled dependent on exceeding or falling short of a limit speed. It is thus possible that, for example, a limit speed of 5 km/h can be specified by the control and as soon as the control records the speed of the motor vehicle being exceeded by >5 km/h, the control disables the actuating device. In this functionality, the control would operate the actuating device at any time at which the motor vehicle exceeds the limit values which would lead to a multitude of actuations of the means for disabling.

It is alternatively conceivable and advantageous that the means for disabling is always bolted. This means that the actuating device would not be able to be operated in the normal state and would block or uncouple it, for example, and would only be released or coupled in the case of actuation of the actuating element, for example. In particular in relation to use of the actuating device in relation to a front bonnet, a small number of movements or functions of the means for disabling could hereby be attained.

According to the invention, a multitude of possible combinations could be conceivable and advantageous. Thus, for example, actuation of the actuating element could thus lead to the means for disabling being activated and, for example, blocking of the actuation transmission means being canceled. It is also conceivable that in the case of actuation of the actuating element a coupling module is coupled and thus only enables the actuating device. On the one hand, this offers the advantage of necessitating the least possible number of movements in the means for disabling and, on the other hand, for example, in the case of movement of the motor vehicle above a limit speed the actuating device is then not available for the operator at all.

It can also be advantageous, for example, if a bolted actuating device is unbolted by means of initial actuation of the actuating element and only during repeated actuation of the actuating element the actuating device transfers the front bonnet from a locked position into a braced position, for example. In the case of repeated actuation of the actuating element, the front bonnet could then reach into a release position. This offers the highest degree of safety as, during every actuation of the actuating element, on the one hand the functional position of the means for disabling can always be queried by means of the control and there is also the possibility of querying by means of the control whether the motor vehicle moves above or below a limit speed.

In a further exemplary embodiment, the means for disabling can always be unlocked or coupled. After initial actuation of the actuating element, the front bonnet then reaches a supported position. At the same time, exceeding or falling short of the defined limit speed is queried or recorded by means of the control. According to the case of exceeding or falling short, in the second stroke a transfer of the front bonnet into a release position is possible or transfer of the front bonnet into the release position is prevented. Prevented means that the means for disabling is uncoupled, for example, prior to the second actuation.

Advantageously, the means for disabling can be unlocked or coupled in permanent actuation. If a power outage or power drop now occurs in the motor vehicle, the means for disabling is thus functionally ready. In other words, the operator is able to open the motor bonnet or front bonnet manually and without an external power source.

If at least two locks are provided for and if the actuation transmission means encompasses a switch wherein the means for disabling acts directly on the switch, a further advantageous embodiment of the invention thus results. If the actuation transmission means is a Bowden cable, for example, wherein two locks are operated by means of the Bowden cable, a means for disabling can thus be used in the area of a switch. This offers an advantage as the switch is already present as a separate component and encompasses a guide for the ends of the Bowden cables, for example. The guide present in the switch can be used in order to enable blocking of the guide by means of an electrical drive and/or a bolt and/or a lifting chain, for example and/or to enable uncoupling of the Bowden cables. Uncoupling hereby means that a first Bowden cable component is uncoupled between the actuating element and the switch from the two Bowden cables to the respective locks. As the switch is already present, a microdrive can be easily installed on the switch as an electrical drive with a blocking mechanism. If, for example, a switching means is arranged on a bolt of the blocking mechanism directly, it can thus be locked directly on the state of the bolt and thus the means for disabling. A cost-effective and structurally simple solution is thus provided to increase the safety of an actuating device.

The object of the invention is solved in a procedural solution by a method for controlling an actuating device with at least a lock, in particular a lock for a front bonnet of a motor vehicle being provided in which by means of an initial actuation of an actuating element the front bonnet is brought from a locked position into a supported position and by means one further actuation of the actuating element the front bonnet is brought from the supported position into a release position and the actuation is executed by means of an actuation transmission means arranged between the lock and the actuating element, and in which the actuating device is disabled by means of a means for disabling.

Due to the formation of the procedure according to the invention, in which in particular during multi-level opening of a lock a further safety function is integrated to open a front bonnet. In particular, the disablement of the actuating device offers the possibility of an operator receiving feedback visually and/or acoustically and/or haptically in order to show that a safety-related function is operated. A traffic risk can thus be directly prevented and the operator is simultaneously shown that this function is no longer available. In both cases, unintentional opening of the front bonnet is prevented.

Hereinafter, the invention is explained in further detail with reference to the attached drawings on the basis of a preferred exemplary embodiment and on the basis of a schematic drawing. However, the principle applies that the exemplary embodiments do not restrict the invention, but only constitute advantageous embodiments. The illustrated characteristics can be executed individually or in combination with further characteristics of the description and also the patent claims individually or in combination.

Figure 2:
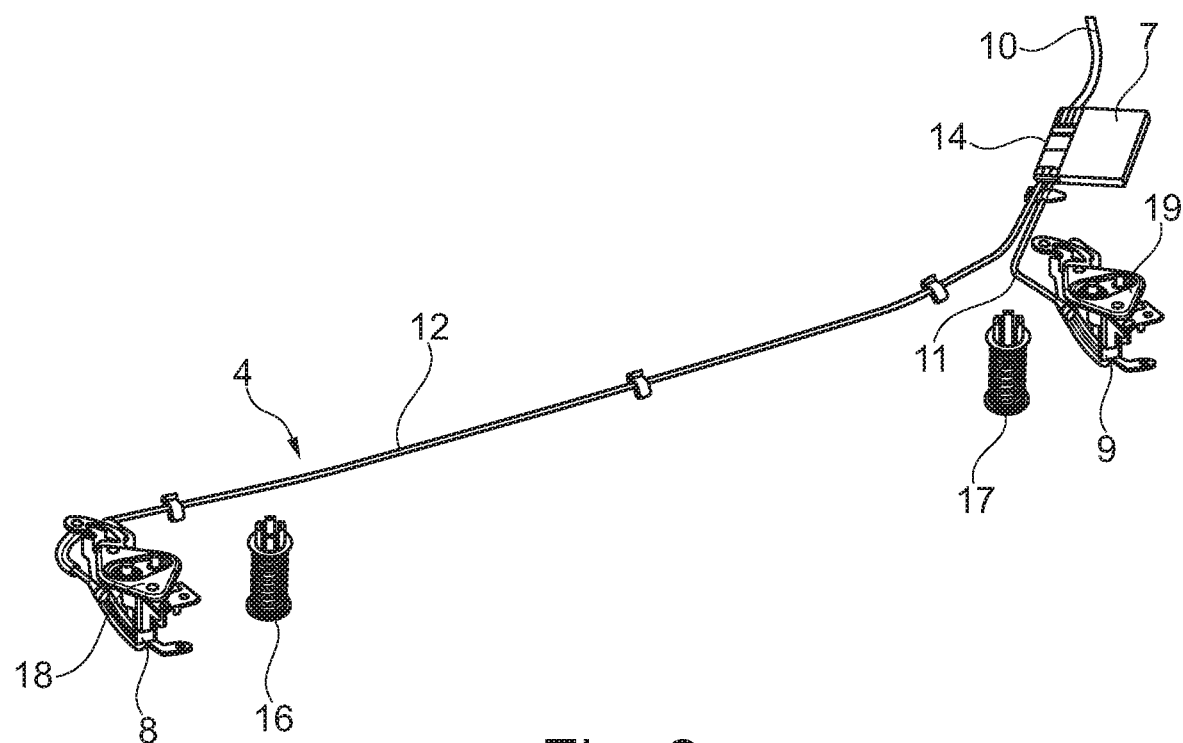
Figure 3:
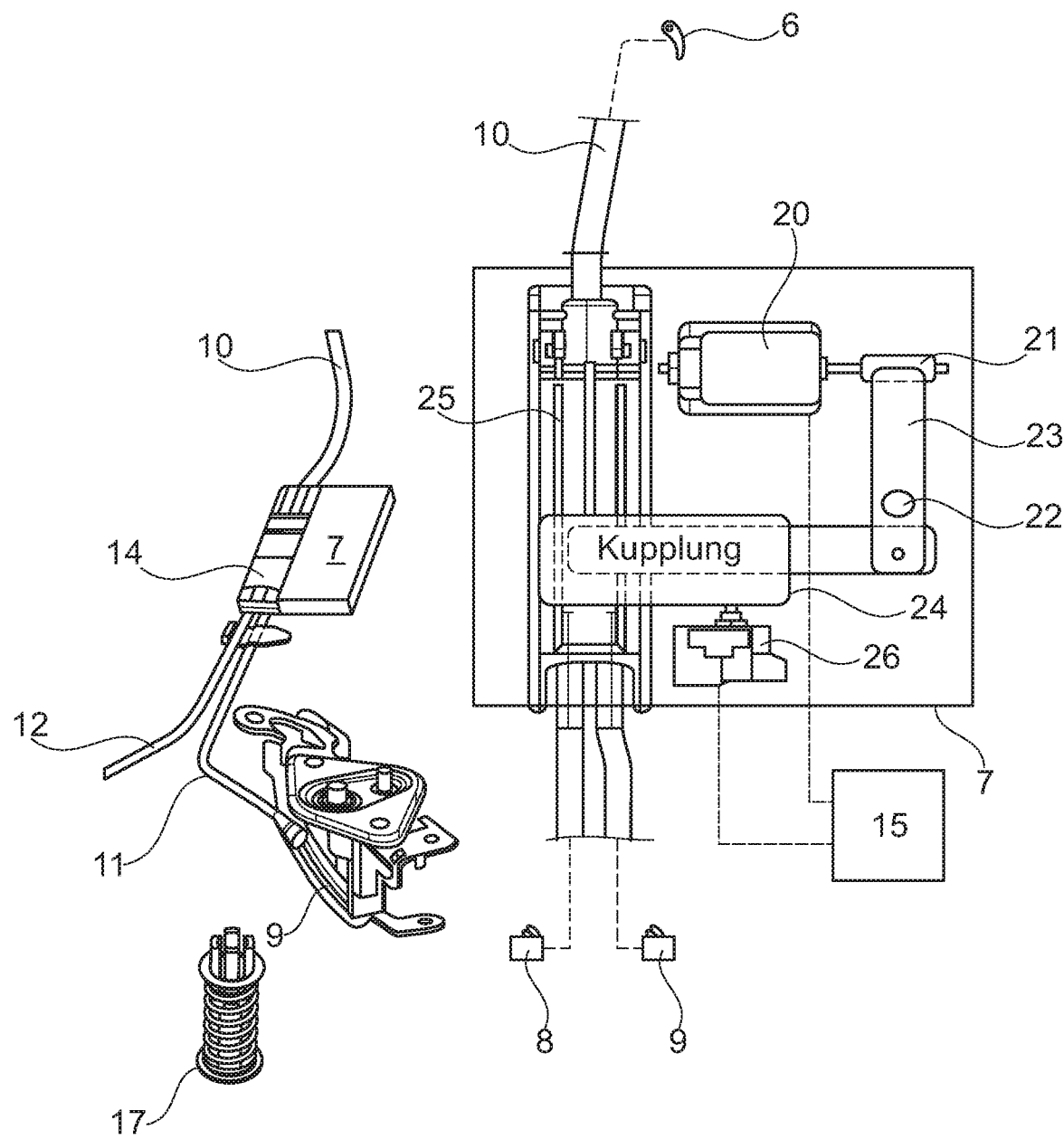

It shows:

FIG. 1 a top view of a part of a motor vehicle with a schematic drawing of an arrangement of an actuating device, FIG. 2 an exemplary embodiment of an actuating device in the case of use with a switch and two locks, and FIG. 3 an enlarged illustration of a part of the actuating device according to FIG. 2.

A view of a motor vehicle 1 is reproduced in a top view in FIG. 1. A front area 2 is illustrated in which a front bonnet 3 of the motor vehicle 1 is arranged in a pivoting manner. The motor vehicle 1 has an actuating device 4 which can be operated from inside 5 the motor vehicle 1. The actuating device 4 has an actuating element 6, a means for disabling 7, respectively a lock 8, 9 on the opposite sides of the motor vehicle 1, a first Bowden cable 10 between the actuating element 6 and the means for disabling 7, a second Bowden cable 11 between the means for disabling 7 and a first lock 9 and a further Bowden cable 12 between the means for disabling 7 and a lock 8.

The actuating element 6 can be executed as a pivot lever, for example, which can be operated from the inside 5 of the motor vehicle 1. By means of the actuating element 6 the first Bowden cable 10 is operated so that, for example, a tensile force can be brought to the means for disabling, for example. The means for disabling 7 is arranged in this exemplary embodiment on a driver's side 13 of the motor vehicle 1. The means for disabling 7 is formed as a switch so that a tensile movement of the first Bowden cable 10, for example, can be brought uniformly to the Bowden cables 11, 10 of the locks 8, 9. By means of actuation of the actuating element 6, opening of a locking mechanism of the locks 8, 9 can thus be unlocked.

By means of unlocking of the locks 8, 9 the front bonnet 3 can be brought from a locked position into a supported position. After repeat actuation of the actuating element 6 the front bonnet 3 is released, wherein, for example, an arresting hook is removed from the engagement area of the front bonnet 3 so that the front bonnet 3 can be brought from a supported position into a release position. By means of the means for disabling 7, the actuating device 4 can be disabled. For this purpose, the means for disabling 7 can block the movement of a valve in the switch 14, for example.

The means for disabling 7 would preferably block the valve in the switch in a starting or normal position. A control 15 of the motor vehicle 1 could record actuation of the actuating element 6, for example and cancel the blocking of the switch 14. The electrical connection between the actuating element 6 and the means for disabling 7 are reproduced as dashed lines in FIG. 1. Actuation of the actuating element 6 could consequently be detected by the control 15, wherein the control 15 could transmit a signal to the means for disabling 7 so that a blocked switch or an uncoupled switch could either be coupled or the blockage could be canceled.

Even if the means for disabling 7 is arranged in the switch 14 in this exemplary embodiment, according to the inventions other constellations of the arrangement, in particular the detection means of an actuation of the actuating device 4 and also the means for disabling 7 to other components of the actuating device 4 are naturally also conceivable according to the different embodiments.

A part of the actuating device 4 is reproduced from FIG. 1 as an exemplary embodiment in FIG. 2. The first Bowden cable 10, and the Bowden cables 11, 12 which are respectively connected to the locks 8, 9 starting from the switch 14 are illustrated. In addition to the locks 8, 9 put-up hinges 16, 17 are arranged which enable lifting of the front bonnet 3 after unlocking or release of the front bonnet 3. The put-up hinges 16, 17 act by means of the compression springs and are known. The locks 8, 9 respectively interact with the lock holders 18, 19 attached to the front bonnet 3.

The means for disabling 7 is arranged on the switch 14 and can uncouple a valve arranged in the switch 14, for example, and thus enable a bolted state of the actuating device 4. Advantageously a bolted actuating device 4 forms the highest degree of safety as actuation of the actuating device 4, for example in the case of exceeding a limit speed of the motor vehicle 1 would not uncouple the switch 14, so that actuation of the actuating element 6 would remain ineffective. Although the operator could operate the actuating element 6 as the switch 14 is uncoupled, the force initiated into the Bowden cable 10 by means of the actuating element 6 will not transfer to the Bowden cables 11, 12 of the locks 8, 9. A risk due to opening of a front bonnet 3 thus remains ineffective by means of an operator during a motor vehicle 1 trip.

An enlarged illustration of the means for disabling 7 is reproduced in an exemplary embodiment in FIG. 3. The means 7 encompasses an electromotor 20, an interlocking 21 attached to the electromotor 20, a lever 23 pivotably accommodated around an axis 22 which interacts with a coupling joint 24. The coupling joint 24 acts on a valve 25, which forms a part of the switch 14. A switching means 26, here in the form of a microswitch, can record the position of the means for disabling 7 and in particular the coupling joint 24. Naturally, the coupling joint 24 could also constitute a blocking means, so that actuation of the actuating element 6, illustrated as a pivot lever 6 in this exemplary embodiment, could block or disengage it.

As depicted with the dashed lines between the control 15, the switching means 26 and the electromotor 20, the position of the means for disabling 7 can be recorded by means of the control and, according to the position, speed and movement of the actuating element 6 the blockage can be canceled or retained. Naturally, the control 15 can also be combined with other switching means in the lock 8, 9 or the actuating element 6 and to undertake a relevant evaluation in relation to a limit speed, for example, and thus prevent opening of the front bonnet. A highest degree of safety can thus be provided for the motor vehicle operator.

REFERENCE SIGN LIST

1 Motor vehicle
2 Front area
3 Front bonnet
4 Actuating device
5 Inside the motor vehicle
6 Actuating element, pivot lever
7 Means for disabling
8,9 Locks
10,11,12 Bowden cable
13 Driver's side
14 Switch
15 Control
16, 17 Push-in hinge
18, 19 Lock holder
20 Electromotor
21 Interlinking
22 Axis
23 Lever
24 Coupling element
25 Valve
26 Switching means

The invention claimed is:

1. An actuating device for a lock for a front bonnet of a motor vehicle, the actuating device comprising:
   a lock holder,
   a rotary latch, wherein the rotary latch is brought by the lock holder into a locked position of the rotary latch,
   an actuating element connected to the rotary latch, wherein after a first actuation of the actuating element the front bonnet is brought from a locked position of the bonnet that corresponds to the locked position of the rotary latch into a supported position and wherein after at least one further actuation of the actuating element the front bonnet is brought into a release position,
   an actuation transmission between the actuating element and the rotary latch,
   a means for disabling the actuating device, with the result that actuation of the rotary latch by the actuating element is suppressible, and
   a control configured to detect a speed of the motor vehicle, wherein the means for disabling is controlled based on the speed detected by the control,
   wherein the means for disabling acts directly on the actuation transmission.

2. The actuating device according to claim 1, wherein the means for disabling is a component of the actuating element and/or the rotary latch.

3. The actuating device according to claim 1, wherein the actuation transmission is blocked by means of the means for disabling.

4. The actuating device according to claim 1, wherein the actuating element is disengaged by the means for disabling.

5. The actuating device according to claim 1, wherein the means for disabling is operated electrically.

6. The actuating device according to claim 1 further comprising a switch configured to query a position of the means for disabling.

7. The actuating device according to claim 1, wherein at least two rotary latches are provided for and the actuation transmission includes a switch and the means for disabling acts directly on the switch.

8. A method for controlling the actuating device according to claim 1, the method comprising:
   providing the first actuation of the actuating element to bring the front bonnet from the locked position of the front bonnet into the supported position;
   providing the at least one further actuation of the actuating element to bring the front bonnet from the supported position into the release position, wherein actuation is executed by the actuation transmission arranged between the rotary latch and the actuating element, and
   disabling the actuating device by the means for disabling.

9. An actuating device for a lock for a front bonnet of a motor vehicle, the actuating device comprising:
   a lock holder,
   a rotary latch, wherein the rotary latch is brought by the lock holder into a locked position of the rotary latch,
   an actuating element connected to the rotary latch, wherein after a first actuation of the actuating element the front bonnet is brought from a locked position of the front bonnet that corresponds to the locked position of the rotary latch into a supported position and wherein after at least one further actuation of the actuating element the front bonnet is brought into a release position,
   an actuation transmission between the actuating element and the rotary latch,
   a means for disabling the actuating device, with the result that actuation of the rotary latch by the actuating element is suppressible, and
   a switch configured to query a position of the means for disabling.

10. An actuating device for a lock for a front bonnet of a motor vehicle, the actuating device comprising:
   a lock holder,
   a rotary latch, wherein the rotary latch is brought by the lock holder into a locked position of the rotary latch,
   an actuating element connected to the rotary latch, wherein after a first actuation of the actuating element the front bonnet is brought from a locked position of the front bonnet that corresponds to the locked position of the rotary latch into a supported position and wherein after at least one further actuation of the actuating element the front bonnet is brought into a release position,
   an actuation transmission between the actuating element and the rotary latch,
   a means for disabling the actuating device, with the result that actuation of the rotary latch by the actuating element is suppressible, and
   wherein at least two locks are provided for and the actuation transmission includes a switch and the means for disabling acts directly on the switch.

* * * * *